United States Patent Office 3,022,121
Patented Feb. 20, 1962

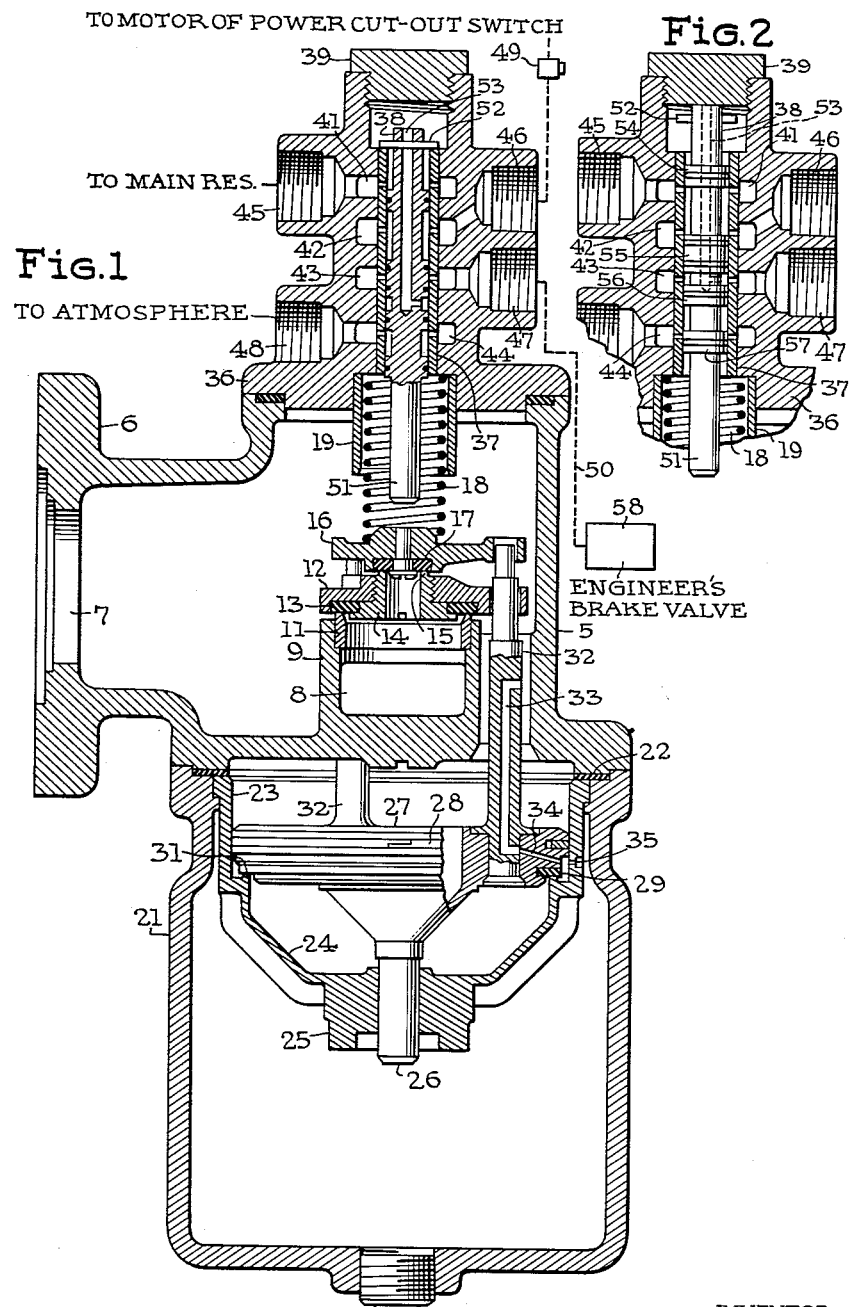

3,022,121
EMERGENCY BRAKE VALVE WITH SECONDARY POWER CONTROL
Lynn I. Pickert, Watertown, N.Y., assignor to The New York Air Brake Company, a corporation of New Jersey
Filed Dec. 3, 1959, Ser. No. 857,191
4 Claims. (Cl. 303—82)

This invention relates to air brakes and particularly to emergency application functions. In its functions, it resembles the subject matter of an application filed in the name of Lewis A. Safford, on the 28th day of October, 1959, Serial No. 849,380, and assigned to the present applicant's assignee. It is subordinate to, but considered an improvement upon the Safford structure in that it has fewer parts, particularly fewer springs, and is suited to mass production on a notably economical basis.

Most air-brake control valves include an emergency valve, and in several of these the emergency valve serves to charge an accessory pipe when the emergency valve responds in emergency. This charging response can be applied usefully in many ways, for example, to operate rail sanders, or operate power shut off for the propelling engines, or both, or to perform other functions useful when an emergency stop is in progress. These are incidental functions stemming from, but not strictly a part of the Safford invention.

Applicant's assignee has long manufactured under the Campbell Patent 1,938,738, issued December 12, 1933, a brake pipe vent valve known as the KM vent valve, which is simple and remarkably reliable. It responds to brake-pipe pressure reductions exceeding a critical intensity, whether these are initiated by conditions local to the brake pipe, such as a break-in-two, or whether they are initiated by manipulation of the engineer's brake valve or by opening of a dead-man valve. As the KM vent valve was so used prior to Safford's invention, no means to charge an accessory pipe was afforded, so that the versatility of the valve can be improved.

The present device follows Safford's concept in that it substitutes a new cap on an otherwise standard KM vent valve. The structure in this new cap includes a pneumatically loaded piston which functions as a combined piston motor and piston valve. The use of O-ring seals on the combined piston and valve component permits a simple construction in which this component is adequately sealed and is free of undue friction.

The effect is to provide a front-end control installation which is simple and reliable and remarkably versatile in that it can be similarly applied to any of several known braking systems without significant remodeling of the system itself, and with the attainment of much desired added functions.

One embodiment which has demonstrated utility in tests is illutsrated in the accompanying drawing, in which:

FIG. 1 is a vertical axial section of the KM vent valve with the improved cap and with connections indicated by legends. The combined piston and valve component is in running position.

FIG. 2 is a view showing the cap with the combined piston and valve component in emergency position.

Statements of direction refer to FIG. 1, to which reference should first be made.

The housing 5 is connected to the brake pipe by a flange 6, and venting flow from the brake pipe and charging flows occur through the passage 7. Venting flows from the space within the housing 5 (and hence from the brake pipe) occur through the port 8 which leads to atmosphere through the side of an upstanding seat member 9 which carries a rim 11, pressed to place and serving as the main exhaust valve seat.

The main exhaust valve 12 closes downward against seat 11 and is sealed, when closed, by an annular gasket 13 held by a flanged tubular nut 14 upper rim 15 serves as the seat for a smaller vent valve 16, which carries a seat gasket 17 held by a screw, as shown. Both valves are seated by a coil compression spring 18 centered in a guide bushing 19.

Held to the bottom of housing 5 by machine screws (not shown) is the cup-shaped reservoir 21. A gasket 22 seals the joint between the parts 5 and 21, and also between the housing 5 and the open-ended cylinder bushing 23 which has a flange seated in a rabbet, as shown. Pendant from the lower edge of bushing 23 is a yoke 24 which supports a guiding hub 25 through which the piston stem 26 is slidable.

The stem 26 projects downward from a piston 27 which carries a metal, expansive piston ring 28 and, on its lower face, has a gasket 29 positioned to seal on an internal rim 31 formed intergrally with cylinder bushing 23. Fixed in piston 27 are three upstanding pins 32, each passing through openings formed in wings on valves 12 and 16. The pins are parallel and spaced at uniform angular intervals. Each pin 32 has spaced shoulders whose spacing is such that as piston 27 moves upward from the lowermost position in which gasket 29 seals against rim 31, the shoulders on the pins open first the smaller valve 16 and then the larger valve 12.

In one of the pins 32 is a charging passage 33 which leads to a restricted stabilizing port 34 which opens through the periphery of piston 27 into the interval between piston ring 28 and gasket 29. From this interval a small charging port 35 leads through the cylinder bushing 23.

The details so far described follow the commercial construction long used under the Campbell patent and need no elaboration. Novel features reside in the substitute cap 36 and parts carried thereby, and in connections thereto.

The bushing 19 is carried by cap 36 just as a functionally identical bushing was carried by the original cap.

The bushing 19 extends at its upper end into a counterbore in cap 36 and projects downward therefrom. A smaller valve-seat bushing 37, for a piston valve 38, is pressed into a bore formed through cap 36. The bore is closed at its upper end by a screw plug 39 which also limits upward motion of valve 38. Bushing 37 is shown as coaxial with bushing 19.

Encircling the bore into which seat-bushing 37 is pressed are four annular grooves 41, 42, 43, 44, each communicating with a corresponding annular series of valve-seat ports drilled radially through the bushing 37. These ports are clearly shown in FIGS. 1 and 2 and are merely port extensions of the grooves 41 to 44 inclusive.

The groove 41 is connected to the main reservoir of the brake system by the tapped opening 45. The groove 42 has a similar tapped opening 46 to afford connection for the line leading to the motor for actuating the power cut-off switch or other accessory device. A bleed choke 49 will slowly dissipate pressures developed in this connection. Groove 43 has a threaded opening 47 for the reset connection 50 from the engineer's brake valve, and groove 44 has a connection 48 which leads to atmosphere and is threaded to receive a conventional wasp excluder (not shown).

The piston valve 38 has a slender stem 51 which projects into the path of valve 16. so that opening movement of valve 16 lifts the valve 38. This motion may stop when the piston 27 reaches its upper limit of motion, but overtravel to the position shown in FIG. 2 commonly occurs, and is caused by momentum. Downward motion of valve 38 is limited by a cross pin 52 which engages the end of bushing 37 but does not close the bore of this bushing nor the bore 53 formed in valve 38.

The stem of valve 38 carries four lands spaced to afford intervening grooves. Each land is sealed to the seat bushing 37 by at least one O-ring, and one land (55) carries two such rings (best shown in FIG. 2 but visible also in FIG. 1).

The lands 54, 55, 56, 57 are numbered on FIG. 2. The bore 53 extends axially through the valve stem from the upper end thereof to the groove between lands 55 and 56.

The groove between lands 54 and 55 always communicates with port groove 42 and hence with the motor of the accessory device. Thus the accessory device is energized in the position of FIG. 2 but not in the position of FIG. 1.

The groove between lands 55 and 56 is connected to axial bore 53. Hence connection 50 is blanked in the position of FIG. 1 but is connected via opening 47 and bore 53 to the space above land 54 in the position of FIG. 2.

The pipe 50 has been called a "reset pipe." As this term is here used, it means a pipe charged with air from the main reservoir by flow through the engineer's brake valve when the engineer's brake valve is in a position to cause a brake application; such as service position or emergency position. It could also be handle-off position, where the engineer's brake valve has such a position. It cannot be running position or release position or any other commonly designated position which will release the brakes or hold them released.

According to the present invention, charging of the reset pipe through the engineer's brake valve conditions the system to terminate charging of the accessory pipe. This compels the engineer to take affirmative action after any response of the KM emergency vent valve, as a condition precedent to regaining complete control of those operating functions which are affected by the charging of the accessory pipe. It is a safety factor in that it requires movement of the engineer's brake valve 58 into a position which causes or preserves a full brake application.

An engineer's brake valve, of any automatic type, is indicated in diagram at 58. This could be constructed according to the patent to May, No. 2,905,507, issued September 22, 1959.

Operation

When a service reduction of brake pipe pressure occurs, the piston 27 rises until the upper shoulders on pins 32 engage valve 16. Stabilizing port 34 is then effective to reduce pressure below piston 27 fast enough to match any service rate of reduction in the brake pipe. Hence the piston rises no further.

When brake pipe pressure is reduced at an emergency rate, the small valve 16 is lifted. The resulting reduction of pressure in housing 5 reduces the closing bias on large valve 12 so valve 12 is immediately opened by the lower shoulders on the pins 32. The venting area through port 8 is equal to the area of the bore of the brake pipe. Consequently an emergency reduction starting at any vent valve in a train will be propagated at high speed throughout the length of the brake pipe.

Each valve 16, as it opens, strikes the related stem 51 and shifts valve 38 to the position of FIG. 2. This admits main reservoir air through the accessory pipe 46 to the motor of the power cut-off switch (or other accessory device).

Since the valve 38 is not spring-biased and in its upper position is pneumatically balanced, it stays up until reset occurs.

What is claimed is:

1. The combination of a brake pipe vent valve shiftable between two positions, namely a running position and a venting position; a single-acting motor; a secondary valve connected with said motor; a one-way lost motion thrust connection between said vent valve and said secondary valve, said secondary valve having a normal position to which it is shifted by the motor, and an abnormal position to which the vent valve positively displaces it as the latter moves to venting position, the secondary valve including a pressure connection, a controlled connection and a pilot connection and serving, in its normal position, to interconnect said pressure connection and said motor and in that same position to close said pilot connection and said controlled connection and, in its abnormal position, serving to interconnect said pilot connection and said motor and to interconnect said pressure connection and said controlled connection.

2. The combination defined in claim 1 and manually operable means to charge the pilot connection.

3. The combination defined in claim 2 in which the manually operable means is an engineer's brake valve, the pilot connection being charged only in a brake applying position of said engineer's brake valve.

4. The combination defined in claim 3 in which the pilot connection is charged only in the emergency position of the engineer's brake valve.

References Cited in the file of this patent

UNITED STATES PATENTS

| 1,185,737 | Turner | June 6, 1916 |
| 1,938,738 | Campbell | Dec. 12, 1933 |
| 2,113,649 | Donovan | Apr. 12, 1938 |